W. Addleton.
Harrow.
Nº 92139. Patented Jul. 6. 1869.
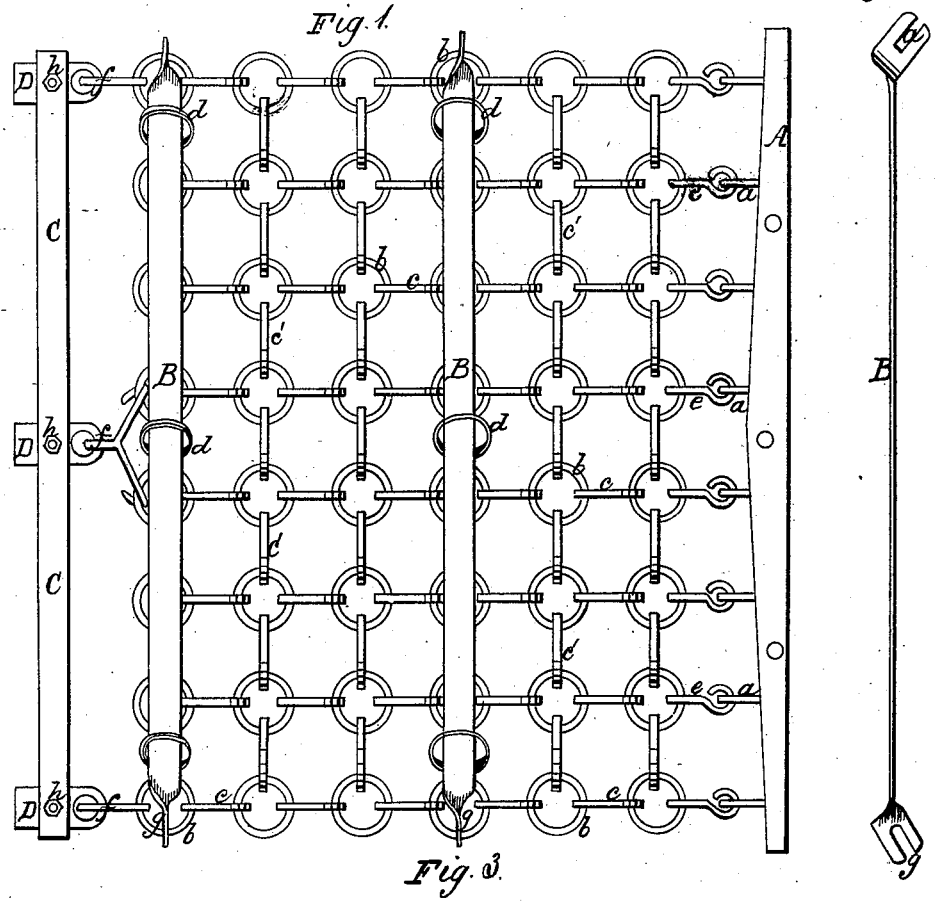
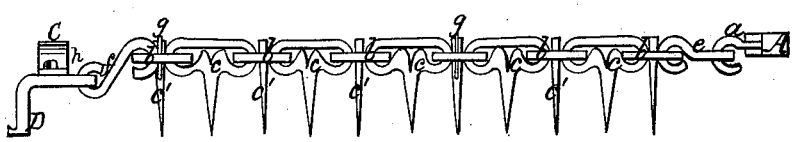
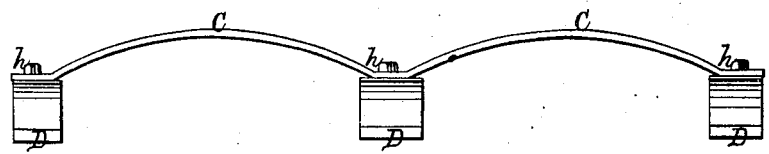
Witnesses					Inventor
Wm. J. Dodge				William Addleton
Hiram C. Soule

United States Patent Office.

WILLIAM ADDLETON, OF MOTTVILLE, NEW YORK.

Letters Patent No. 92,139, dated July 6, 1869.

IMPROVEMENT IN HARROW AND MARKER COMBINED.

The Schedule referred to in these Letters Patent and making part of the same.

*To all whom it may concern:*

Be it known that I, WILLIAM ADDLETON, of Mottville, in the county of Onondaga, and State of New York, have invented a new and useful Improvement in Harrows; and I do hereby declare that the following is a full, clear, and exact description thereof, which will enable those skilled in the art to make and use the same, reference being had to the accompanying drawings, forming part of this specification, in which—

Figure 1 is a plan view of my invention, and
Figure 3 is a side view of the same.
Figures 2 and 4 are detail views.
Similar letters of reference indicate like parts in the several figures.

The body of this harrow is formed by a series or net-work of links, c, with spikes or harrow-teeth upon their lower sides, and by a series of horizontal links or rings, b, for connecting said spike-links to each other, and in this manner a harrow is obtained of such flexibility, that it will adjust itself to uneven surfaces with greater readiness than ordinarily.

In the accompanying drawings—

A, fig. 1, is the front spreader, which is made strong enough to hold the front edge of the harrow extended rigidly, and to this spreader the double-tree or whiffletrees are attached.

B B are elastic spreaders or stretchers, which are made thin, as seen in edge view, fig. 2, so as to yield with the harrow to the uneven surfaces of the ground.

C is a bar, having markers D D D attached, and said bar or marker is secured to the harrow in a detachable manner, by means of hooks or links $f$, and when going over the ground the last time with the harrow, the marker is attached, and when the working of the ground is completed, it is already marked.

For dragging, the harrow is turned over, spikes upward, and the links made to pulverize the lumps, but when so used, the elastic spreaders B B are removed.

I do not wish to confine myself to the particular construction and arrangement of the links forming the body of the harrow, as the spike-links $c'\ c'$ may be omitted, and plain links substituted, for the reason that the spikes or teeth $c'$ are drawn in a direction sidewise to their links, and yield too readily by the rolling of said links.

I do not claim, broadly, a harrow or harrow-frame, composed of links joined together and forming chains, as I am aware that such is not new; but having thus described my invention,

What I claim as new, and desire to secure by Letters Patent, is—

1. A flexible harrow-body, composed of chain or links $b\ c\ c'$, with teeth attached, substantially as and for the purpose herein described.

2. The removable stretcher-bars B B, made elastic or flexible, when constructed, arranged, and applied substantially as and for the purpose set forth.

3. The bar C C, with markers D, when adapted to be detached, in combination with a harrow-frame composed of chain-links, substantially as herein described.

The above specification of my invention signed by me, this 11th day of May, 1869.

WILLIAM ADDLETON.

Witnesses:
WM. J. DODGE,
F. A. MORLEY.